(12) United States Patent
Bozak (10) Patent No.: US 9,334,175 B2
(45) Date of Patent: May 10, 2016

(54) METHOD AND APPARATUS FOR TREATMENT OF FLUIDS

(75) Inventor: Wade R. Bozak, Edmonton (CA)

(73) Assignee: 1501367 Alberta Ltd., Edmonton (CA)

( * ) Notice: Subject to any disclaimer, the term of this patent is extended or adjusted under 35 U.S.C. 154(b) by 720 days.

(21) Appl. No.: 13/391,864

(22) PCT Filed: Jun. 30, 2011

(86) PCT No.: PCT/CA2011/050404
§ 371 (c)(1),
(2), (4) Date: Feb. 23, 2012

(87) PCT Pub. No.: WO2012/000116
PCT Pub. Date: Jan. 5, 2012

(65) Prior Publication Data
US 2012/0145642 A1    Jun. 14, 2012

Related U.S. Application Data

(60) Provisional application No. 61/361,331, filed on Jul. 2, 2010.

(51) Int. Cl.
*C02F 1/24* (2006.01)
*C10G 1/04* (2006.01)
(Continued)

(52) U.S. Cl.
CPC .............. *C02F 1/24* (2013.01); *B01D 17/0208* (2013.01); *B01D 17/044* (2013.01); *B01D 19/0036* (2013.01); *B01D 19/0042* (2013.01);
(Continued)

(58) Field of Classification Search
None
See application file for complete search history.

(56) References Cited

U.S. PATENT DOCUMENTS 2,730,240 A * 1/1956 Johnson .................. 208/188
3,318,448 A    5/1967 Fryer
(Continued)

FOREIGN PATENT DOCUMENTS

CA    1 152 855 A    8/1983
CA    1 164 383 A    3/1984
(Continued)

OTHER PUBLICATIONS

"About Flo Trend® Systems—Filtration, Solid/Liquids Separation Using Dewatering Boxes, Container Filters, Oil/Water Separators, etc.," Flo Trend® Systems, Inc., Houston, Texas, 2003, <file:///E|/F/F380/03/Flo%20Trend%20-%20Filtra...ontainer%20filters,%20oil-water%20separators,%20etc.htm> [retrieved Jan. 16, 2006], 5 pages.
(Continued)

*Primary Examiner* — Thomas M Lithgow
(74) *Attorney, Agent, or Firm* — Christensen O'Connor Johnson Kindness PLLC (57) ABSTRACT

A method of fluid treatment of a feed comprising oil and water, the method comprising: supplying the feed into a flotation cell, the feed having an oil concentration, the flotation cell containing a working fluid and the working fluid having a surface; removing an oil phase from the surface of the working fluid; removing fluid from the flotation cell through one or more outlets below a working fluid level in the flotation cell; and controlling flow through the one or more outlets to maintain the working fluid level in the flotation cell within a predetermined range independent of variations in the oil concentration of the feed. A related apparatus is also disclosed.

13 Claims, 3 Drawing Sheets

(51) Int. Cl.
*B01D 17/02* (2006.01)
*B01D 17/04* (2006.01)
*B01D 19/00* (2006.01)
*B03D 1/02* (2006.01)
*B03D 1/24* (2006.01)
*C10G 33/06* (2006.01)
*B03D 1/14* (2006.01)
*C02F 1/00* (2006.01)
*C02F 1/40* (2006.01)
*C02F 101/32* (2006.01)
*C02F 103/36* (2006.01)

(52) U.S. Cl.
CPC ........... *B03D1/028* (2013.01); *B03D 1/247* (2013.01); *C10G 1/045* (2013.01); *C10G 33/06* (2013.01); *B03D 1/1406* (2013.01); *B03D 1/1456* (2013.01); *B03D 2203/006* (2013.01); *C02F 1/008* (2013.01); *C02F 1/40* (2013.01); *C02F 2101/32* (2013.01); *C02F 2103/365* (2013.01); *C02F 2201/008* (2013.01); *C02F 2209/03* (2013.01); *C02F 2209/40* (2013.01); *C02F 2209/42* (2013.01); *C02F 2301/08* (2013.01); *C10G 1/047* (2013.01); *C10G 2300/805* (2013.01)

(56) References Cited

U.S. PATENT DOCUMENTS

| | | | |
|---|---|---|---|
| 3,764,008 A | 10/1973 | Darley | |
| 3,963,599 A | 6/1976 | Davitt | |
| 4,110,215 A | 8/1978 | Bramlett | |
| 4,111,789 A | 9/1978 | Porteous | |
| 4,229,295 A | 10/1980 | Krofchak | |
| 4,338,185 A | 7/1982 | Noelle | |
| 4,399,039 A | 8/1983 | Yong | |
| 4,414,117 A | 11/1983 | Yong | |
| 4,424,112 A | 1/1984 | Rendall | |
| 4,425,227 A | 1/1984 | Smith | |
| 4,451,184 A | 5/1984 | Mitchell | |
| 4,545,892 A | 10/1985 | Cymbalisty | |
| 4,842,777 A | 6/1989 | Lamort | |
| 4,938,865 A | 7/1990 | Jameson | |
| 5,022,984 A * | 6/1991 | Pimley et al. | 209/170 |
| 5,110,457 A | 5/1992 | Krawl | |
| 5,118,408 A | 6/1992 | Jansen | |
| 5,188,726 A | 2/1993 | Jameson | |
| 5,223,148 A * | 6/1993 | Tipman et al. | 210/744 |
| 5,332,100 A | 7/1994 | Jameson | |
| 5,340,467 A | 8/1994 | Gregoli | |
| 5,460,270 A | 10/1995 | Chan | |
| 5,494,584 A | 2/1996 | McLachlan | |
| 5,516,434 A * | 5/1996 | Cairo et al. | 210/703 |
| 5,656,173 A * | 8/1997 | Jordan et al. | 210/703 |
| 5,664,733 A | 9/1997 | Lott | |
| 5,775,446 A | 7/1998 | Lott | |
| 5,879,541 A | 3/1999 | Parkinson | |
| 5,935,445 A | 8/1999 | Febres | |
| 5,935,447 A | 8/1999 | Febres | |
| 6,007,708 A * | 12/1999 | Allcock et al. | 208/391 |
| 6,074,549 A | 6/2000 | Bacon Cochrane et al. | |
| 6,106,733 A | 8/2000 | Wood | |
| 6,162,021 A | 12/2000 | Sarshar | |
| 6,337,023 B1 * | 1/2002 | Broussard et al. | 210/703 |
| 6,419,807 B1 * | 7/2002 | Davies et al. | 204/406 |
| 6,453,939 B1 | 9/2002 | Cook | |
| 6,527,960 B1 * | 3/2003 | Bacon et al. | 210/741 |
| 6,821,060 B2 | 11/2004 | McTurk | |
| 6,935,367 B2 | 8/2005 | Cook | |
| 7,135,107 B2 | 11/2006 | Palmer | |
| 7,404,903 B2 | 7/2008 | Bozak | |
| 7,416,671 B2 | 8/2008 | Bozak | |
| 8,137,566 B2 | 3/2012 | Bozak | |
| 8,404,121 B2 * | 3/2013 | Bias et al. | 210/703 |
| 2007/0090025 A1 * | 4/2007 | Strand | 208/391 |
| 2007/0114183 A1 * | 5/2007 | Lee et al. | 210/703 |
| 2007/0131590 A1 | 6/2007 | Bozak | |
| 2008/0277318 A1 | 11/2008 | Bozak | |
| 2009/0020458 A1 | 1/2009 | Bozak | |
| 2010/0230326 A1 * | 9/2010 | Young et al. | 209/164 |

FOREIGN PATENT DOCUMENTS

| | | |
|---|---|---|
| CA | 2 055 213 C | 8/1996 |
| CA | 2 257 158 A1 | 12/1997 |
| CA | 2 241 304 A1 | 1/1999 |
| CA | 2 230 306 A1 | 8/1999 |
| CA | 2 319 566 A1 | 8/1999 |
| CA | 2 229 970 C | 11/1999 |
| CA | 2 453 697 A1 | 6/2005 |
| CA | 2 510 099 A1 | 1/2006 |
| CA | 2 531 007 A1 | 6/2007 |
| CA | 2 632 849 A1 | 6/2007 |
| CA | 2 534 746 A1 | 7/2007 |
| CA | 2 685 084 A1 | 12/2008 |
| CA | 2 594 182 A1 | 1/2009 |
| CA | 2 634 748 A1 | 1/2009 |
| DE | 43 12 725 C1 | 3/1994 |
| WO | 99/06891 A1 | 2/1999 |
| WO | 2006/134235 A1 | 12/2006 |
| WO | 2008/144801 A1 | 12/2008 |

OTHER PUBLICATIONS

"Cavitation Sparging System: Enhanced Column Flotation," Product Brochure, Canadian Process Technologies Inc., Delta, Canada, at least as early as 2010, 8 pages.

"Fluids Environmental Services (FES)—Cuttings Re-Injection / Slurrification," Product Information, Baker Hughes, Houston, Texas, 2006, <http://www.printthis.clickability.com/pt/cpt?action=cpt &title=Fluids+Environmental+Services+-+Cuttings...> [retrieved Jan. 16, 2006], 2 pages.

"Genflo Jet Pumps—Scrub Your Aggregates," Product Information, Genflo Technologies CC, Germiston, South Africa, n.d., <http://www.genflopumps.com/scrubbing.html> [retrieved Mar. 17, 2004], 2 pages.

"Lobestar® Mixing Eductor for Liquid and Slurry Applications," Product Information, Vortex Ventures Inc., Houston, Texas, 2003, <http://www.vortexventures.com/Products/LobestarMixingEductors/LobestarMixing Educto...> [retrieved Sep. 21, 2005], 3 pages.

"Oil Sands Innovators Nominated for ASTech Award," News & Events, Department of Chemical and Materials Engineering, University of Alberta, Edmonton, Canada, Nov. 5, 2010, 2 pages.

"ROV Dredge Pumps," Data Sheet ZJS 100, Advanced Marine Innovation Technology Subsea Ltd, Gosport, United Kingdom, n. d., <file:///E|/F/F380/03/Advanced%20Innovation... Dredge%20Pumps%20and%20Underwater%20Engineering.htm> [retrieved Jan. 16, 2006], 3 pages.

Schramm, L.L., et al., "Temperature Effects in the Conditioning and Flotation of Bitumen From Oil Sands in Terms of Oil Recovery and Physical Properties," Petroleum Society's Canadian International Petroleum Conference, Calgary, Canada, Jun. 11-13, 2002, Paper 2002-074, 13 pages.

Xu, Y., and H. Hamza, "Thickening and Disposal of Oil Sand Tailings," Mining Engineering 55(11):33-39, Nov. 2003.

International Search Report mailed Apr. 28, 2011, issued in corresponding International Application No. PCT/CA2011/050008, filed Jan. 11, 2011, 3 pages.

"ZJS100 ROV Dredge Pumps,"Data Sheet ZJS100, © 2004 Advanced Marine Innovation Technology Subsea Ltd, Gosport, U.K., 3 pages.

* cited by examiner

```
┌─────────────────────────────────────────────────────────────┐
│ Supplying the feed into a flotation cell, the feed having an oil concentration, the │
│ flotation cell containing a workgin fluid and the working fluid having a surface.   │
└─────────────────────────────────────────────────────────────┘
      100 ──┘             │
                          ▼
     ┌─────────────────────────────────────────────────────┐
     │ Removing an oil phase from the surface of the working fluid. │
     └─────────────────────────────────────────────────────┘
       101 ──┘            │
                          ▼
┌─────────────────────────────────────────────────────────────┐
│ Removing fluid from the flotation cell through one or more outlets below a working │
│                 fluid level in the flotation cell.                                  │
└─────────────────────────────────────────────────────────────┘
   102 ──┘                │
                          ▼
┌─────────────────────────────────────────────────────────────┐
│ Controlling flow through the one or more outlets to maintain the working fluid level │
│ in the flotation cell within a predetermined range independent of variations in the  │
│                    oil concentration of the feed.                                    │
└─────────────────────────────────────────────────────────────┘
   104 ──┘  106 ──┐
                         Fig. 3
```

```
          ┌──────────────────────────────────────────────┐
          │     Supplying the feed into a first flotation cell.  │
          └──────────────────────────────────────────────┘
            108 ──┐           │
                              ▼
    ┌──────────────────────────────────────────────────────────┐
    │ Removing fluid from the first flotation cell through a first outlet below a │
    │          working fluid level in the first flotation cell.                   │
    └──────────────────────────────────────────────────────────┘
         110 ──┘              │
                              ▼
    ┌──────────────────────────────────────────────────────────┐
    │ Supplying fluid from the first flotation cell into a second flotation cell. │
    └──────────────────────────────────────────────────────────┘
         112 ──┐              │
                              ▼
    ┌──────────────────────────────────────────────────────────┐
    │ Removing fluid from the second flotation cell through a second outlet below │
    │          the working fluidlevel in the second flotation cell.               │
    └──────────────────────────────────────────────────────────┘
         114 ──┐              │
                              ▼
    ┌──────────────────────────────────────────────────────────┐
    │ Controlling the flow through the first outlet and the second outlet to maintain │
    │ the working fluid level in the first flotation cell and the second flotation cell│
    │ within respective predetermined ranges independent of variations in the oil      │
    │                     concentration in the feed.                                   │
    └──────────────────────────────────────────────────────────┘

Fig. 4
```

METHOD AND APPARATUS FOR TREATMENT OF FLUIDS

CROSS-REFERENCES TO RELATED APPLICATIONS

This application is a National Stage of International Application No. PCT/CA2011/050404, filed Jun. 30, 2011, which claims the benefit of U.S. Provisional Application No. 61/361,331, filed Jul. 2, 2010.

BACKGROUND

Field: treatment of tailings, for example tailings from tailings ponds resulting from oil sands production. In oil sands production, bitumen may be extracted from a mixture that is approximately 10% bitumen, 80% sand, and 10% fine tailings. The fine tailings are generally deposited in a tailings pond. However, fine tailings will not fully settle in these tailing ponds. It is believed that the electrostatic interactions between the suspended particles, which are still partly contaminated with hydrocarbons, prevent this from occurring. These tailing ponds have become an environmental liability for the companies responsible.

The oil sands tailings ponds constitute an unanticipated but persistent environmental and economic problem. They reflect process deficiencies in the bitumen extraction methods currently used. The problem has been mitigated by the industries to some degree, but there are several ponds that still present a major challenge for reclamation. Recent studies have been published that address the treatment of tailings as they are produced, in order to avoid the need for the large settling and storage areas.

SUMMARY

A method of fluid treatment of a feed comprising oil and water, the method comprising: supplying the feed into a flotation cell, the feed having an oil concentration, the flotation cell containing a working fluid and the working fluid having a surface; removing an oil phase from the surface of the working fluid; removing fluid from the flotation cell through one or more outlets below a working fluid level in the flotation cell; and controlling flow through the one or more outlets to maintain the working fluid level in the flotation cell within a predetermined range independent of variations in the oil concentration of the feed. An apparatus for fluid treatment of a feed comprising oil and water, the apparatus comprising: a flotation cell connected to receive a feed through an inlet, the flotation cell containing a working fluid and the working fluid having a surface; a working fluid level monitor sensitive to working fluid surface variations in the flotation cell; an oil phase removal device for removing oil above a pre-determined level in the flotation cell; a flow control device on one or more outlets of the flotation cell; and a controller connected to send control signals to the flow control device in response to signals from the working fluid level monitor to maintain the working fluid level in the flotation cell within a predetermined range independent of variations in oil concentration in the feed.

In various embodiments, there may be included any one or more of the following features: The feed is supplied from a phase separator that uses energy from fluid passing through a restriction to effect a phase separation. The feed comprises a foam mixture of oil, water and gas. Controlling comprises controlling the flow of the feed into the flotation cell to maintain the working fluid level in the flotation cell within the predetermined range. The method further comprises monitoring the working fluid level in the flotation cell by sensing the pressure of working fluid in the flotation cell. The pressure is sensed at a base of the flotation cell. The oil phase is removed from the flotation cell over a weir. At least an outlet of the one or more outlets is from a base of the flotation cell. The feed is supplied into the flotation cell at the surface of the working fluid. The feed is at least partially spread across the surface of the working fluid. The method further comprises supplying fluid removed from the flotation cell into a second flotation cell, the flotation cell containing a second working fluid and the second working fluid having a surface; removing a second oil phase from the surface of the second working fluid; removing fluid from the second flotation cell through one or more outlets below a working fluid level in the second flotation cell; and controlling flow through the one or more outlets in the second flotation cell to maintain the working fluid level in the second flotation cell within a predetermined range independent of variations in the oil concentration of the fluid supplied to the second flotation cell. Fluid removed from the flotation cell is supplied into the second flotation cell through a phase separator, which uses energy from fluid passing through a restriction to effect a phase separation. The phase separator agitates the fluid removed from the flotation cell in the presence of a gas to cause the fluid to foam. The oil phase removed from the second flotation cell is removed over a weir. The working fluid level monitor comprises a pressure sensor in the flotation cell. The pressure sensor is located at a base of the flotation cell. The oil phase removal device comprises a weir. The apparatus further comprises a phase separator, which in operation uses energy from fluid passing through a restriction to effect a phase separation, connected to supply the feed to the inlet. The phase separator further comprises: a conduit containing the restriction through which the feed flows during operation; a mixing chamber in the conduit downstream of the restriction; and a port for admission of gas into the mixing chamber to cause the feed to foam. The apparatus further comprises: a second flotation cell with an inlet connected to at least an outlet of the one or more outlets, the second flotation cell containing a second working fluid and the second working fluid having a surface; a second working fluid level monitor sensitive to working fluid surface variations in the second flotation cell; a second oil phase removal device for removing oil above a pre-determined level in the second flotation cell; a second flow control device on one or more outlets from the second flotation cell; and the controller being further connected to send control signals to the second flow control device in response to signals from the second working fluid level monitor to maintain the working fluid level in the second flotation cell within a predetermined range independent of variations in the oil concentration in the flow into the second flotation cell. The second flotation cell is connected to at least an outlet of the one or more outlets of the flotation cell through a phase separator that in operation uses energy from fluid passing through a restriction to effect a phase separation. The inlet is at the surface of the working fluid. The inlet comprises a diffuser oriented to at least partially spread the feed across the surface of the working fluid in use.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Tailings may contain primarily both hydrocarbons and solids, for example mineral material, such as rock, sand, silt and clay. Because of the hydrocarbon contamination of the tailings stored in tailings ponds, the process below is particularly useful in reclaiming these ponds by removing the contamination, and using the decontaminated tailings to return land to its natural state. However, the apparatus and method may also be applied to any fluid having components to be separated, such as an oil-water mixture, oil-solid mixture, or oil-water-solid mixture, oil including hydrocarbons. In some embodiments the apparatus and method may run emulsion, for example directly off of the field bypassing a free water knock out. In some embodiments feed is supplied from a tank farm on site. The fluid to be treated may comprise tailings from deep within a tailings pond, without dilution, so long as the tailings are pumpable. If the tailings are not pumpable, they may be made pumpable by dilution with water. Fluid from a skim oil tank may be treated. In general, the apparatus and method disclosed herein may be used to separate immiscible fluids such as oil and water.

Figures 1, 2:
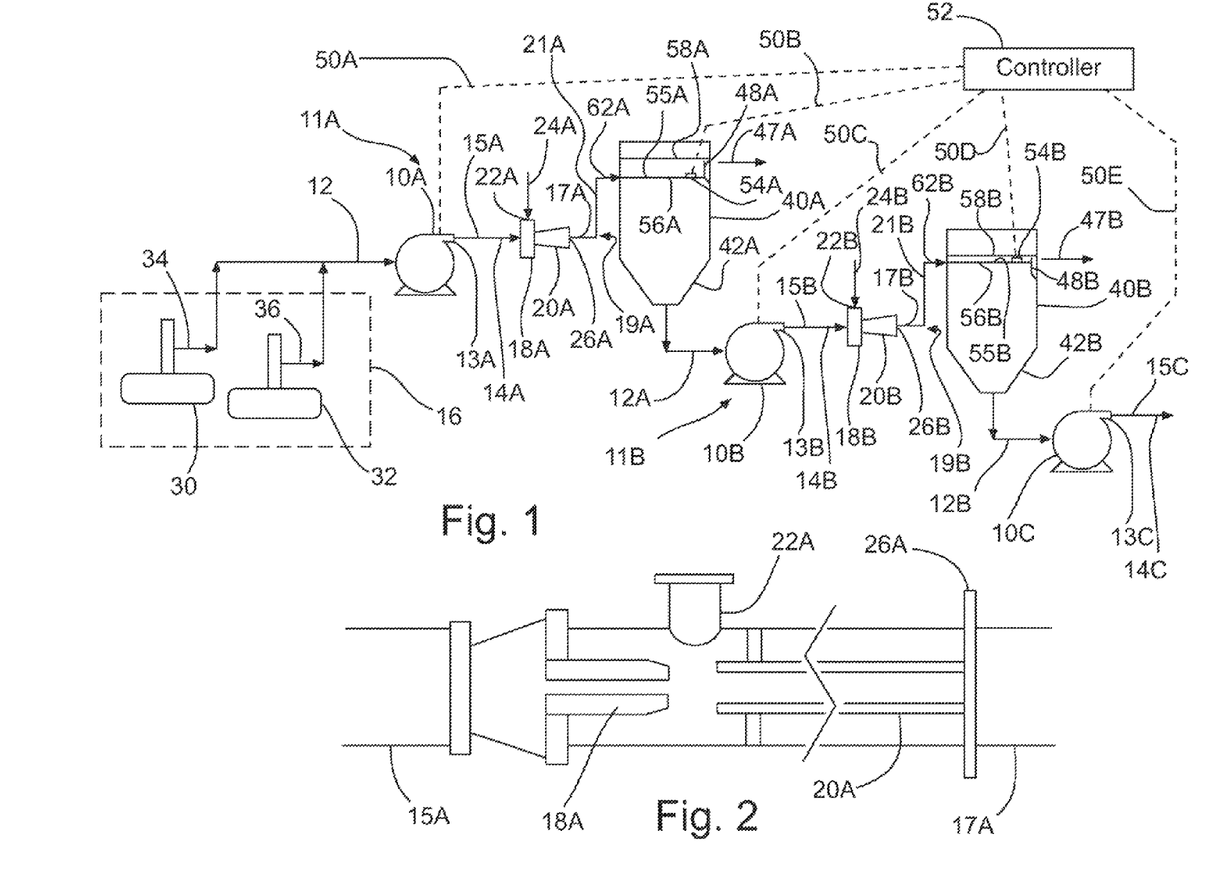
FIG. 1 is a schematic showing an exemplary fluid treatment device.
FIG. 2 is a detailed schematic, not to scale, of a phase separator for use in the process of FIG. 1.

Referring to FIGS. 1-2, a method and apparatus of fluid treatment of a feed of oil and water are described. Components may be described with reference numerals ending in alphabetical letters, and it should be understood that same-numbered reference numerals ending in different letters may refer to components that have the same characteristics. Referring to FIG. 1, the apparatus comprises a flotation cell 40A as shown, which contains a working fluid. The working fluid may be water. Initially, the flotation cell 40A may be filled to a specified level with the working fluid. The flotation cell 40A is also provided with a working fluid level monitor, such as monitor probe 54A, sensitive to working fluid surface variations in the flotation cell. The flotation cell 54A is also provided with an outflow control device such as a motive pump 10B, and a controller 52. Flotation cell 40A is connected to receive a feed through an inlet 62A, for example from a source such as a phase separator 11A.

Figure 5:
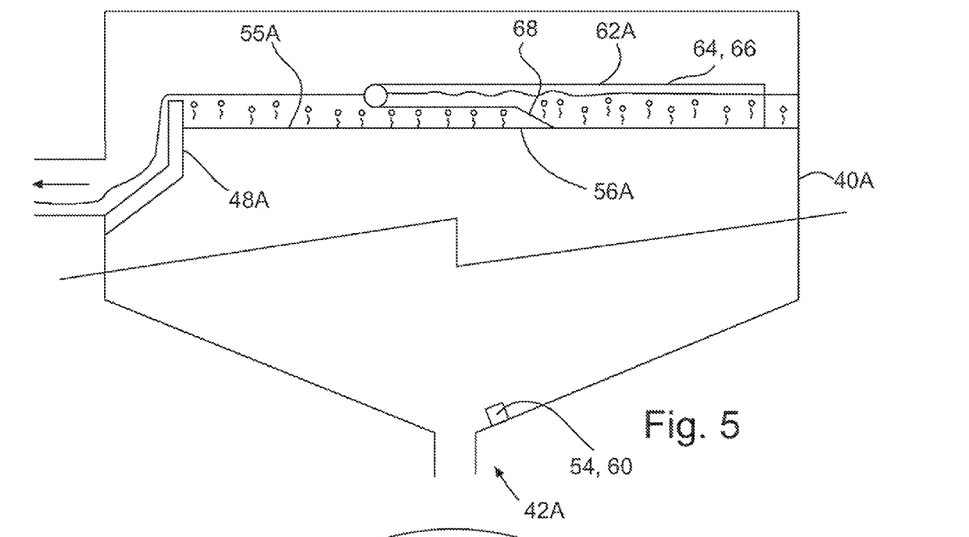
FIG. 5 is a side elevation view, in section, of a flotation cell with a pressure sensor.

Referring to FIG. 5, the working fluid level monitor 54A may comprise a pressure sensor 60 in the flotation cell 40A. The pressure sensor 60 may be located at a base 42A of the flotation cell 40A to measure the hydrostatic pressure, i.e. weight, of the column of water in the cell 40A, in order to allow the controller 52 (shown in FIG. 1) to compute based on the density of the working fluid whether or not the working fluid level 56A is within the predetermined range. The working fluid density may be computed from conventional sensors such as a coriolis meter (not shown) in cell 40A if desired, although this may not be required in the case where the working fluid density is expected to remain fairly constant, for example at 1 gm/cc. Pressure sensor 60 may be a dual head pressure transmitter or other suitable pressure sensor 60 such as a flanged pressure disc (not shown). A load sensor coupled to sense changes in the weight of cell 40A may also be used for the purpose of pressure sensing. Prior to introducing feed, pressure sensor 60 may be calibrated by filling the cell 40A with working fluid to within the desired range of working fluid levels, measuring the pressure, and programming the controller 52 to adjust the inflow and outflow of cell 40A to maintain the sensed pressure within the calibrated range indicative of working fluid levels within the predetermined range of levels. For calibration purposes, the working fluid may be substantially oil free, although this is not required and in some cases the working fluid may have an oil phase above the working fluid level during calibration as may be present during use. When the feed, including aerated oil is supplied to cell 40A, the aerated oil, which has much lower density than the working fluid and regular non aerated oil, remains on top of surface 55A and may leave cell 40A without substantially affecting the working fluid column height.

Referring to FIG. 5, preferably, the feed is input to the flotation cell 40A through an inlet 62A at the surface 55A of the working fluid as shown so that the working fluid is minimally disturbed by the feed. Supply at surface 55A has been found to be advantageous over conventional supply below surface 55A because separation efficiency is increased as more of the frothy aerated oil from the feed remains within the oil phase while denser water and solids sink into the working fluid, and also because the working fluid level is less obscured by rising oil and gas, both of which may otherwise form an emulsified region that may make working fluid level measurement difficult. In addition, injection at or above surface 55A has been found not to substantially modify the density of the working fluid as sub surface 55A injection may do. Thus, apparatus 10 may be run for periods of time such as weeks or months, based solely on pressure readings that assume a constant density of working fluid in the cell 40A. Although surface 55A injection of feed is described above, the feed inlet 62A may be positioned at other suitable locations in cell 40A, such as below the working fluid level. An oil phase removal device 48A (FIGS. 5 and 6) may also be provided with the flotation cell 40A for removing oil above a pre-determined level in the flotation cell 40A. The oil phase removal device may for example be a weir as shown. The working fluid level is set below the weir.

Referring to FIGS. 1 and 2, the phase separator 11A may in operation use energy from fluid passing through a restriction 18A (also shown in FIG. 2) to effect a phase separation, for example to strip oil from solids to produce an oil phase mixed with water and solids that may be dispersed on the surface of the working fluid. The oil phase may also contain water and solids, but upon dispersal on the surface of the working fluid, at least some of the water and solids, having been separated from the oil phase with the separator 11A, will enter the working fluid of the flotation cell 40A. The working fluid level monitor 54A may be at least partially located in the flotation cell 40A. The flow control device is located on one or more outlets, such as outlet 12A from the base 42A of cell 40A. The one or more outlets 12A are adapted to draw fluids from below a working fluid level 56A during operation of the cell 40A. Controller 52, such as a programmable logic controller, is connected to send control signals to motive pump 10B in response to signals from the working fluid level monitor 54A in order to maintain the working fluid level 56A within a predetermined range, independent of variations in oil concentration in the feed. Maintaining within a predetermined range may comprise maintaining the working fluid level at a single predetermined level in one embodiment. The apparatuses described are able to self balance on feed entry of oil slugs and surges. Thus, when the inflow has a high oil fraction, more oil spills over the weir and the pumps on the outflow are controlled to reduce outflow of water to keep the water (working fluid) level within a predetermined range. When the inflow has a high water fraction, a small amount of oil spills over the weir, and a relatively larger outflow of water is maintained by the pumps. In one example, the apparatus was able to accommodate for oil percentage fluctuations in the feed of between 1 and 10%, although almost any magnitude of fluctuation may be accommodated.

A second flotation cell 40B may be provided with an inlet 62B connected to outlet 12A, the second flotation cell 40B containing a second working fluid such as water and the second working fluid having a surface 55B. A second phase separator 11B may be connected between outlet 12A and the second flotation cell 40B. Second phase separator 11B may operate under similar principles as separator 11A. Similar to cell 40A, cell 40B may have a level monitor 54B, and a flow control device such as a motive pump 10C on an outlet 12B of cell 40B. Controller 52 may be further connected to send control signals to the motive pump 10C in response to signals from the working fluid level monitor 54B, which may be a float-operated monitor, to maintain the working fluid level 56B in cell 40B within a predetermined range independent of variations in the oil concentration in the flow into the cell 40B. In some embodiments one or more controllers 52 may be used such as a separate controller (not shown) to operate the components of cell 40B in a fashion similar to the operation of cell 40A by controller 52. More than two cells may be used, for example three or more. Also similar to cell 40A, cell 40B may have a second oil phase removal device 48B for removing oil above a pre-determined level in the second flotation cell 40B.

Figure 3:
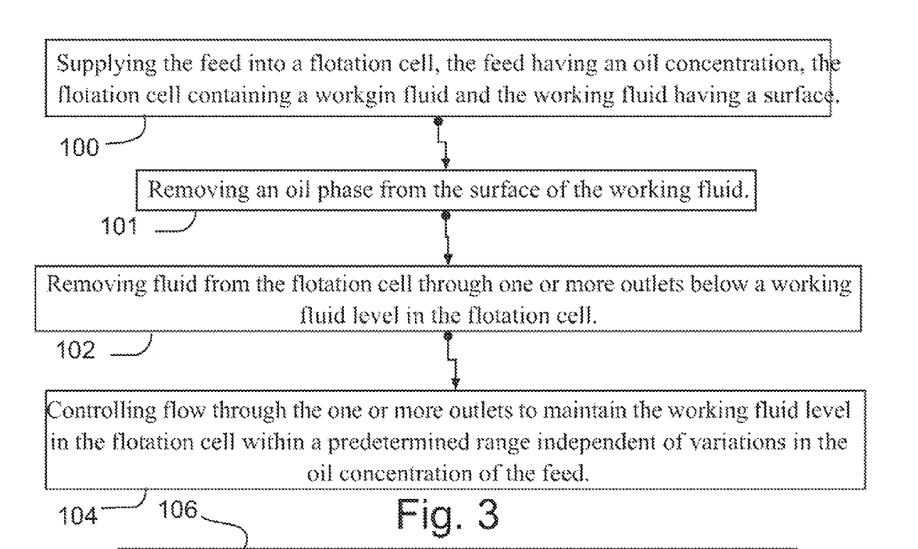
FIG. 3 is a flow diagram illustrating a method of fluid treatment of a feed comprising oil and water.
Figure 4:
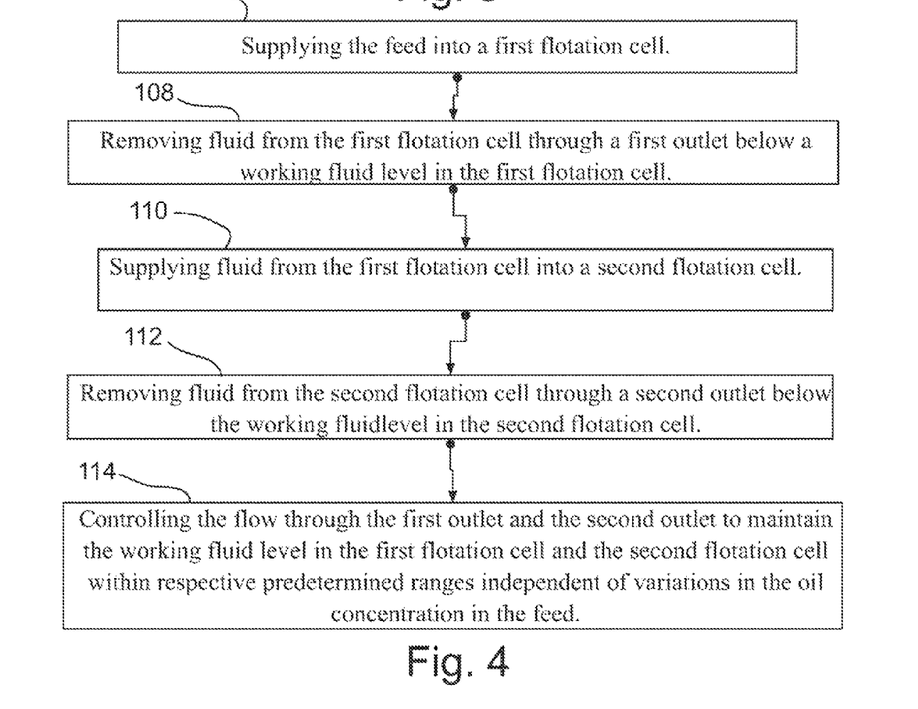
FIG. 4 is a flow diagram illustrating a further method of fluid treatment of a feed comprising oil and water.

Referring to FIGS. 3 and 4, various methods of fluid treatment are disclosed. Referring to FIGS. 1 and 3, in a stage 100 the feed from phase separator 11A is supplied into cell 40A, while in a stage 101 an oil phase is removed from the interfacial surface 55A of the working fluid. In a stage 102 fluid is removed from cell 40A through outlet 12A below working fluid level 56A. In a stage 104, flow through the outlet 12A or outlets is controlled, for example by controller 52, to maintain the working fluid level 56A within a predetermined range independent of variations in the oil concentration of the feed. In order to determine what the working fluid level is, level monitor 54A may be used (FIGS. 1 and 2). However, as described above the working fluid level in cell 40A may be preferably monitored by sensing the pressure of working fluid in the flotation cell 40A using a pressure sensor 60 (FIG. 5).

Controller 52 may have control lines, such as lines 50A-E, connected to each component to be controlled or monitored. For example, lines 50B and 50D connect controller 52 to working fluid level monitors 54A and 54B, respectively, in order for controller 52 to monitor the instant working fluid level in cells 40A and 40B, respectively. Lines 50A, 50C, and 50E connect to pumps 10A, 10B, and 10C, respectively, in order to allow controller 52 to control the flow through each pump. Thus, based on the signals received from level monitors 54A and 54B, and the difference between the actual working fluid level in a cell and a predetermined threshold level, controller 52 adjusts the operation of the various flow control devices in the system, such as by changing pump speed, pressure, flow rate or a combination of such parameters.

Controller 52 may also be set to control the flow of the feed into the first flotation cell 40A in addition to controlling the flow out of the cell 40A through outlet 12A, in order to maintain the working fluid level in the first cell 40A within the predetermined range. In some cases controller 52 may give priority to a preset flow rate into the cell 40A, so that the flow rate of input feed is adjusted from the preset flow rate only if the flow through outlet 12A is outside a predetermined range, for example if the flow through outlet 12A drops too low or too high from an operating range. Thus, the controller may be set to govern at least three protocols, namely 1) the flow rate of feed into the cell, 2) the output pressure of the flow control device or devices pumping working fluid and/or solids out of the cell, and 3) the level of working fluid in each cell. The second protocol is over the first protocol, while the third protocol is over the first two protocols and governs the entire operation of the rest of the system.

When used with more than one cell 40A in series such as is shown in FIG. 1, the apparatus and method described may effect a cascading control philosophy to ensure optimal operation of an entire system of fluid treatment cells despite variations in feed oil concentration during treatment. Such variations are inevitable when dealing with tailings feeds, and are capable of upsetting an entire separation system operated by conventional means. This is because conventional multi-separator fluid treatment devices are either calibrated to treat feeds that have a constant oil concentration or are run passively with each tank draining by gravity into a subsequent tank. In the separation of bitumen from tailings and in other cases it may be difficult or impossible to directly monitor input oil concentration as oil is adsorbed tightly to bits of clay and mud in a type of suspension and is thus difficult to measure on the fly. Thus, the disclosed methods and apparatuses are advantageous in that they indirectly measure changes in feed oil concentration by monitoring working fluid levels in each cell 40 and automatically adjusting the flux of working fluid and solids through each cell to maintain a relatively constant and predetermined working fluid level in each flotation cell.

An illustration of the adjustment of flow parameters in the apparatus will now be described with reference to FIGS. 1 and 4. In stage 106, input feed is initially drawn through phase separator 11A at a preset flow rate and pressure, agitated in the phase separator 11A, and sent into first cell 40A. An oil phase may also be removed from the surface 55B of the working fluid as was done in cell 40A in stage 101. For illustrative purposes, the input feed or feeds into cell 40A is considered to initially have 10% oil concentration. First cell 40A separates out for example 90% of the oil, such that the separated oil floats up to oil level 58A above working fluid level 56A, while the remaining oil may remain absorbed to tailings solids that sink to the bottom of cell 40A and are pumped through outlet 12A and passed through phase separator 11B into cell 40B in stages 108 and 110. In stage 112, working fluid, solids, and any oil still adsorbed to the solids pass from cell 40B through outlet 12B. In stage 114, in order to maintain working fluid level 56A within a range of predetermined levels, for example at a predetermined working fluid level, the flow through outlet 12A is adjusted by controller 52 by adjusting the parameters of second phase separator 11B and effectively the net flux of working fluid, solids or working fluid and solids through the cell 40A to zero at equilibrium. Using similar control, controller 52 adjusts the parameters of motive pump 10C to maintain the predetermined level in cell 40B. If the input feed drops to for example 5% oil concentration, initially the working fluid levels 56A and 56B will increase as more water and solids enter each cell 40A and 40B per unit of time. Sensing the changes in working fluid levels 56A and 56B, controller 52 adjusts the operation of pumps 10B and 10C in order to re-achieve equilibrium by lowering working fluid levels 56A and B to their desired levels. This cascading effect may also require adjustments to the input feed flow, such as if controller 52 realizes that the predetermined working fluid level in cell 40A can only be met if the flow rate through outlet 12A rises above a maximum preset flow rate. In such a scenario, controller 52 may decide to lower the flow through phase separator 11A to achieve the predetermined working fluid level. Similar adjustments may be made of phase separator 11B to adjust the working fluid level 56B in cell 40B. By such means, the entire system operates continuously and efficiently to treat the feed mixture.

Referring to FIGS. 1 and 2, the phase separator 11A may comprise a conduit 14A, a mixing chamber 20A, and a port 22A. A motive pump 10A having an inlet 12A and an outlet 13A may also be part of the phase separator 11A. The inlet 12A may be connected to a source 16 of fluid having components to be separated. A conduit 14A may be connected to the outlet 13A of the motive pump 10A. The conduit 14A may have a discharge 19A. A restriction 18A in the conduit 14A may form a nozzle through which the fluid flows when the motive pump 10A is operated. The restriction 18A may divide the conduit 14A into an upstream end 15A between the motive pump 10A and nozzle and a downstream end 17A that terminates at the discharge 19A. The conduit 14A may have a mixing chamber 20A downstream of the nozzle and a port 22A for admission of gas 24A into the mixing chamber 20A for example in an initial portion of the mixing chamber 20A, to cause the feed to foam. The motive pump 10A, restriction 18A, mixing chamber 20A and port 22A together comprise a phase separator. By mixing gas with the feed in a turbulent manner, the feed may be foamed, which facilitates removal of the oil phase from the surface 55A of the working fluid. Induction of gas may produce pico bubbles in the stream that attach to each droplet of oil to remove the oil from the water or solid phases.

In the example shown, the mixing chamber 20A may terminate downstream at a transition 26A in the conduit 17A to a larger diameter portion 21A of the conduit 14A. The mixing chamber 20A may have a length to internal diameter ratio of at least 20:1 or 40:1, preferably in the range 50:1 to 60:1. Improved separation of the fluid components has been found to occur as the length to internal diameter of the mixing chamber 20A increases from 20:1 to 60:1. For example, by comparison with a conventional jet pump under the same testing conditions, a jet separator of the type disclosed here with a mixing chamber having a 40:1 length to diameter ratio (actual diameter: 43 mm) had an approximately 40% higher mass production of froth during treatment of oil sands tailings. The conventional jet pump had a mixing chamber with a length to diameter ratio of approximately 5:1 and actual diameter 44 mm. By same test conditions is meant: same feed material, same diameter piping on either side of the jet separator/jet pump, same flow rate and same pressure. The only difference, other than the minor difference in mixing chamber diameter between the two set ups, was the replacement of the jet separator described here with a conventional jet pump. The author of this document has found that improved performance in terms of froth generation is obtained from a jet separator when the mixing chamber has a length to diameter ratio larger than a conventional jet pump, which the author understands to have a mixing chamber with a length to diameter ratio of less than 20:1. Large improvements in the effectiveness of the mixing chamber 20A have not been measured for length to internal diameter ratios greater than 60:1. The mixing chamber 20A preferably has constant internal diameter along the length of the mixing chamber 20A. When the mixing chamber 20A does not have constant internal diameter, the internal diameter of the mixing chamber 20A, for the purpose of calculating the length to internal diameter ratio, may be the mean internal diameter. The internal diameter of the mixing chamber 20A may be selected so that the fluid exiting the restriction 18A undergoes turbulence and collision with all parts of the internal wall of the mixing chamber 20A. The mixing chamber 20A may need only begin after the fluid exiting the restriction 18A has expanded sufficiently to contact the walls of the mixing chamber 20A. Although the phase separator may not pump anything other than air from the port 22A, it may have the general design of a jet pump in terms of the relationship of the size of the mixing chamber to the restriction. In one embodiment, the phase separator pumps natural gas instead of air through port 22A. For example, the phase separator may induce entry, into the stream, of gas such as natural gas or nitrogen from the gas blanket (not shown) that may be provided over the components of the apparatus described herein during use. A gas blanket is conventionally set up using piping to all tanks and lines to exclude oxygen and ensure a non-explosive atmosphere.

The port 22A may be located downstream of the restriction 18A and before the mixing chamber 20A. The conduit 14A immediately after the restriction 18A should have a diameter sufficient to accommodate the jet exiting the restriction 18A. The mixing chamber 20A may have an internal diameter that is less than the internal diameter of the conduit 15A (before the restriction 18A) and greater than the diameter of the restriction 18A. Hence, if the conduit 15A is a 16 inch pipe, and the restriction is 6 inches, then the mixing chamber may have an internal diameter between 6 inches and 16 inches, for example 12 inches. For a 12 inch internal diameter mixing chamber 20A, the mixing chamber 20A may be 40 feet long. For treatment of tailings, the diameter of the restriction 18A may be selected to provide a pressure in the conduit 15A before the restriction 18A of 75 psi to 150 psi. The conduit 14A after the transition 26A may have an internal diameter equal to the internal diameter of the upstream portion 15A of the conduit 14A.

The feed or fluid having components to be treated may comprise solids such as tailings from a tailings pond, such as a tailings pond at a heavy oil mining facility. In an example, the fluid source 16 may comprise a first submersible pump 30 connected to pump fluid from a first portion of a tailings pond and a second submersible pump 32 connected to pump fluid from a second portion of a tailing pond. The pumps 30, 32 respectively have outlets 34, 36 connected to the inlet 12 of the motive pump 10A. The pump 32 may be deeper in the tailings pond than the pump 30 so that the weight percent of solids of fluid in the first portion of the tailings pond is less than the weight percent solids of fluid in the second portion of the tailings pond.

The port 22A preferably comprises a valve, which may be controlled manually or automatically such as by controller 52. When the port 22A is not open, a vacuum created in the conduit 14A downstream of the pump 10A may cause vibration within the pipe and poor separation of the fluid components. When the port 22A is opened sufficiently for the vibration to stop, the fluid components may be agitated and a phase separation may occur within the fluid so that oil may be stripped from solids. Gas, for example air, introduced through the port 22A may become entrained with the fluid components and tends to adhere to oil in the fluid. Thus, the phase separator agitates the fluid removed from the flotation cell in the presence of a gas to cause the fluid to foam.

The discharge 19A may be disposed to discharge treated fluid into a secondary separation apparatus such as a flotation tank 40A, for example through inlet 62A. Other secondary separation apparatus may be used, such as a centrifuge, hydro-cyclone or another fluid treatment apparatus comprising an additional motive pump 10A, restriction 18A, mixing chamber 20A and port 22A. Any number of additional such secondary apparatus may be used as necessary to effect an adequate phase separation. Thus, the fluid treatment device may comprise a series connected combinations of motive pump 10A, restriction 18A, mixing chamber 20A and port 22A together connected between a source of fluid 16 and a secondary separation apparatus such as flotation tank 40A, for example as shown with reference numbers ending in "B".

A slightly wet solid phase may be extracted from conical base 42A of flotation tank 40A via line 44 and pump 10B. The wet solids may be allowed to dry or dried in various ways, such as with the addition of heat, but may also be allowed to drain. Once dried, the solids may be returned to a reclaimed mine site or subject to further processing, for example to extract minerals from the solids. Exemplary minerals that may be extracted include gold and titanium. Oil may be extracted from the tank 40A for example by spillover or skimming at line 47A. The oil may be delivered to a pipeline or subject to further processing. Addition of gas 24A at the port 22A facilitates flotation of oil in the flotation tank 40A.

The disclosed fluid treatment devices may operate by pumping fluid using the motive pump 10A through the restriction 18A in the conduit 14A into the mixing chamber 20A downstream of the restriction 18A. Gas may be added into the fluid downstream of the restriction 18A in an initial portion of the mixing chamber 20A. The fluid may be discharged from the conduit 14A for example into a secondary treatment device such as the flotation tank 40A.

The fluid having components to be separated, such as tailings, may be supplied to the mixing chamber 20A through the port 22A from a source of the fluid such as from one of the pumps 30, 32. Motive fluid to be pumped by pump 10A may be water, for example supplied from a portion of a tailings pond through the other of pumps 30, 32. The port 22A may comprise one or more openings in the conduit downstream of the restriction 18A but upstream of the mixing chamber 20A. If more than one opening is used, gas, for example air, may be supplied through one opening and the fluid to be treated through another opening. As many openings as required may be used. Flow through the port 22A may be regulated by a valve or valves. The term opening may be used here to denote a port. While air may be injected simply through the valve, a further conduit leading to a source of the fluid that is being treated may be required for the delivery of fluid to the port 22A.

Figure 6:
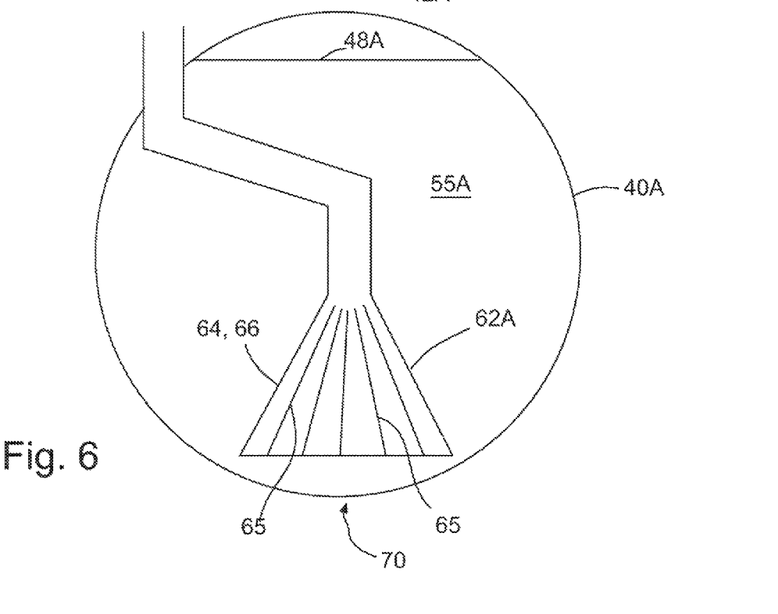
FIG. 6 is a top plan view of a diffuser used to supply feed into the flotation cell of FIG. 5 at the surface of the working fluid.

Referring to FIGS. 5 and 6, when a flotation cell 40A is used to receive fluid from the discharge 19A, the flow into the cell 40A through inlet 62A may be preferably gently dispersed into the flotation cell without vigorous contact with the fluid already in the flotation cell 40A. To allow for gentle dispersion of the treated fluid from the discharge 19A through inlet 62A into the cell 40A, a diffuser 64, for example a horn diffuser 66 with a plurality of fins 65 or a fan-like diffuser plate (not shown), may be used to spread the treated fluid on the surface 55A of the flotation cell 40A or the fluid may flow across a gentle sloping pan 68 before flowing into fluid already in the flotation cell 40A. Diffuser 64 is oriented to at least partially spread the feed across the surface 55A of the working fluid in use. Thus, although cell 40A is referred to as a flotation cell it may be distinguished from conventional flotation cells in that aeration may occur at the jet phase separator level outside the cell instead of instead the cell. Flotation cell 40A operates as a separator tank where oil is separated from water by floating on top of the water. Diffuser 64 may be oriented to expel fluids into cell 40A away from, for example towards the opposite side 70 of cell 40A as, the oil removal device 48A as shown.

The apparatus described herein may be portable, for example if loaded as a module on a skid (not shown) with or without wheels, for transport to a work site. The apparatus may include a housing (not shown) such as a shed to protect system components from the elements. Oil removed from plural cells 40 may be combined and stored in a collection vessel (not shown), which may itself supply an on site oil treater or disc stack centrifuge for example. The methods and apparatuses disclosed herein may be implemented with little or no chemical and heat addition, and thus are expected to reduce the costs of implementation and make the process more environmentally friendly. In fact, the apparatuses and methods may be run at ambient temperature. Hydrocarbons separated during the process may be used to power the apparatus. Fluid entering the apparatus may have for example 10 000 ppm oil, and when finished the oil percentage in working fluids (water) may be 50 ppm or less. In demonstrations, each pass through a flotation cell 40 has been found to remove 80-95% of residual oil in the feed, although higher or lower removal percentages may be achieved. The apparatuses and methods disclosed have been found to reduce the amount of oil and water sent for disposal. Although not intended to be limiting, various applications of the apparatuses and methods disclosed herein include treating fluids used in water/polymer flooding to facilitate water disposal, water recovery or reuse, treating fluids used in in-situ heavy oil batteries to facilitate deep well brine injection, treating fluids intended for third party disposal wells to reduce oil injection into disposal wells as well as enhance oil and water separation to facilitate water deep well injection and reduce contaminated solids for disposal to extend the life of the well, and treating fluids from enhanced oil recovery to achieve a higher percentage of oil that can be sent to treatment resulting in increased sales oil production. Applications also include treatment of fluids from oil sands mining, heavy oil water disposal streams, and SAGD. The apparatuses disclosed herein may include a Fugitive Emission Management system.

Benefits of the apparatus and methods may include, inter alia, the following. Oil may be extracted from an oily water/slurry at a low operating cost as the system processes the waste stream at ambient temperatures. A substantial reduction in chemical consumption for the client may be achieved. The self-balancing aspect of the apparatus and method allows handling of wide fluctuations of oil content with little effect on process efficiency or effluent quality which equates to less down time. The system may be simple and very robust, reducing maintenance issues. The system and method may be configured for a new installation or inserted into the clients existing infrastructure in most cases. The retention of oil from existing production may be increased and the percentage of oil to be re-injected as waste into disposal wells may be reduced. The apparatus and method may address existing waste stream accumulations as well as minimizing future issues. The apparatus and method may clean both the fines and accompanying process water immediately, recovering most of the available water for process recycling or release.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of fluid treatment of a feed comprising oil and water, the method comprising:
    supplying the feed into a flotation cell at a flow rate under control of a controller, the feed having an oil concentration, the flotation cell containing a working fluid and the working fluid having a working fluid level forming a surface of the working fluid;
    removing an oil phase from the surface of the working fluid;
    removing the working fluid from the flotation cell by flow through one or more outlets below the working fluid level in the flotation cell;
    sensing the working fluid level; and
    in response to the sensed working fluid level, using the controller, controlling flow through the one or more outlets and the flow rate of the feed to maintain the working fluid level in the flotation cell within a predetermined range independent of variations in the oil concentration of the feed by applying a priority to the flow rate of the feed into the flotation cell so that the flow rate of the feed is adjusted only if the flow through the one or more outlets is outside of an operating range.

2. The method of claim 1 in which the feed is supplied from a phase separator that uses energy from fluid passing through a restriction to effect a phase separation.

3. The method of claim 1 in which the feed comprises a foam mixture of oil, water and gas.

4. The method of claim 1, further comprising monitoring the working fluid level in the flotation cell by sensing a pressure of the working fluid in the flotation cell.

5. The method of claim 4 in which the pressure is sensed at a base of the flotation cell.

6. The method of claim 1 in which the oil phase is removed from the flotation cell over a weir.

7. The method of claim 1 in which at least an outlet of the one or more outlets is from a base of the flotation cell.

8. The method of claim 1 in which the feed is supplied into the flotation cell at the surface of the working fluid.

9. The method of claim 8 in which the feed is at least partially spread across the surface of the working fluid.

10. The method of claim 1, further comprising:
    supplying fluid removed from the flotation cell into a second flotation cell, the second flotation cell containing a second working fluid and the second working fluid having a surface;
    removing a second oil phase from the surface of the second working fluid;
    removing fluid from the second flotation cell through one or more outlets below a working fluid level in the second flotation cell; and
    controlling flow through the one or more outlets in the second flotation cell to maintain the working fluid level in the second flotation cell within a predetermined range independent of variations in the oil concentration of the fluid supplied to the second flotation cell.

11. The method of claim 10 in which fluid removed from the flotation cell is supplied into the second flotation cell through a phase separator, which uses energy from fluid passing through a restriction to effect a phase separation.

12. The method of claim 11 in which the phase separator agitates the fluid removed from the flotation cell in the presence of a gas to cause the fluid to foam.

13. The method of claim 10 in which the oil phase removed from the second flotation cell is removed over a weir.

* * * * *